United States Patent Office 3,159,623
Patented Dec. 1, 1964

3,159,623
18-HYDROXYMETHYLENE DERIVATIVES
OF YOHIMBONE
John Shavel, Jr., Mendham, and Maximilian von Strandt-
mann, Rockaway Township, N.J., assignors to Warner-
Lambert Pharmaceutical Company, Morris Plains,
N.J., a corporation of Delaware
No Drawing. Filed Oct. 24, 1961, Ser. No. 147,171
2 Claims. (Cl. 260—240)

The present invention relates to new and novel derivatives or yohimbone having the formula

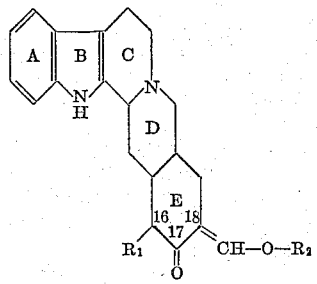

wherein $R_1$ is hydrogen or methyl and $R_2$ is hydrogen, benzoyl or lower acyl, for example acetyl, propionyl, butyryl and the like, to the pharmaceutically acceptable non-toxic acid addition and quaternary ammonium salts thereof and to a method of preparing these compounds.

The compounds of this invention have interesting and significant pharmacological activity, being effective in reducing blood pressure. In addition, these compounds are valuable intermediates useful in the production of other compounds of the yohimbane series.

These compounds bear the A, B, C, D and E rings as depicted in the above formula and are alkaloids of the yohimbane series. Depending upon the configuration of the hydrogen atom at the 3 position and the existence of cis or trans fusion of the D and E rings, four different configurations are possible, that is, yohimbane, 3-epiyohimbane, alloyohimbane and 3-epialloyohimbane. The present invention includes within its scope derivatives of these four families of alkalods being —$R_1$, =O and =CHOR$_2$ substituents at the 16, 17 and 18 positions, respectively.

It has now been found that those compounds of this invention having the formula

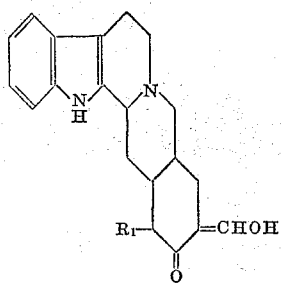

in which $R_1$ is hydrogen or methyl may be prepared by the treatment of a starting material of the formula

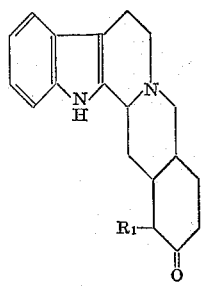

with a lower alkyl ester of formic acid, for example ethyl formate, the presence of a sodium alkoxide, for example sodium ethoxide, or sodium hydride. The reaction is carried out under anhydrous conditions in an inert solvent such as tetrahydrofuran. When a sodium alkoxide is present in the reaction mixture, the reaction is carried out to completion at a temperature of less than 10° C., the mixture is then made slightly acid and distilled under vacuum at a temperature not exceeding 40° C. When sodium hydride is used, a reaction temperature of less than 45° C. is employed, the mixture is filtered and the filtrate is acidified and vacuum distilled at a temperature not exceeding 40° C. The residue in either case is purified by dissolving in dilute aqueous alkali, filtering and making the filtrate silghtly acid. The precipitate constituting the product may be purified by factional precipitation and crystallization.

It has also been found that the 18-hydroxymethylene derivatives of yohimbone alkaloids prepared as described above may be converted to esters of the formula

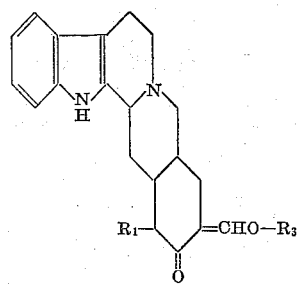

wherein $R_3$ is benzoyl or lower acyl by treatment with an acid anhydride or acyl halide in accordance with conventional esterification techniques.

The compounds of this invention may be converted into their pharmaceutically acceptable non-toxic acid addition or quaternary ammonium salts. Useful acid-addition salts are those formed with such acids as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toleuene sulfonate.

For therapeutic use, the new and novel compounds of this invention, either as the free base or in the form of a pharmaceutically acceptable, non-toxic acid addition or quaternary ammonium salt, may be formulated with a conventional pharmaceutical carrier to form tablets, capsules, elixirs, solutions, suspensions, suppositories and the like.

The following examples are included in order further to illustrate the present invention:

EXAMPLE 1

*18-Hydroxymethyleneyohimbone*

11.5 g. sodium are dissolved in 150 ml. absolute ethanol in a 3 l. three-necked flask, equipped with a condenser, stirrer, dropping funnel, and calcium chloride tubes and the mixture is cooled to 0°.

A blended suspension of 15 g. yohimbone in 1 l. tetrahydrofuran is chilled to 0°, and then is added rapidly to the cooled sodium ethoxide mush under vigorous stirring.

After a 15 min. period, 150 ml. ethylformate are added dropwise over a period 30 min. The cooling and stirring are continued for 10 min. after the completion of the addition. The reaction mixture is then made slightly acidic (pH about 6.5) by the dropwise addition of about 30 ml. glacial acetic acid and is subjected to distillation in high vacuum from a water bath not exceeding 40°. Strong bumping near the end of the distillation can be prevented by the use of a rotary evaporator. A mixture of 300 g. of ice and 300 ml. of 10% sodium hydroxide solution is added to the distillation residue, the mixture being vigorously shaken to speed up the process of solution. The solution is filtered through fritted glass and the filtrate is made weakly acidic (pH about 6.5) by the addition of about 250 ml. 20% acetic acid mixed with an equal volume of ice. The precipitate is filtered off, washed with water, and dried in a vacuum desiccator over sulfuric acid to yield 12 g. (73%) of 18-hydroxymethylene yohimbone.

Fractional precipitation from water at pH 6.2–7.5 followed by recrystallization from acetone-water yields the product as white crystals, M.P. 217°, $[\alpha]_D^{25} = -289°$ (pyridine, c.=0.6).

*Analysis.*—Calc.: C, 74.50; H, 6.88; N, 8.69. Found: C, 74.24; H, 6.93; N, 8.87.

EXAMPLE 2

*18-Hydroxymethyleneyohimbone*

A suspension of 15 g. yohimbone in 800 ml. tetrahydrofuran is added to a suspension of 15 g. of a 50% sodium hydride dispersion in oil in 200 ml. tetrahydrofuran. To the resulting mixture, 300 ml. ethylformate are added over a period of 15 min. at 40°. After stirring for an additional 30–60 min. at 40°, the reaction mixture is filtered and the filtrate is acidified and processed as described in Example 1 to yield 18-hydroxymethyleneyohimbone.

EXAMPLE 3

*18-Hydroxymethylene-16α-Methylyohimbone*

10 g. of a sodium hydride dispersion in oil (50%) are added to 200 ml. tetrahydrofuran in a 2 l. three-necked flask equipped with stirrer, condenser, dropping funnel, and $CaCl_2$ tubes. A suspension of 10 g. 16α-methylyohimbone in 600 ml. dry tetrahydrofuran is then added under stirring. To the resulting reaction mixture, 200 ml. ethyl formate are added dropwise over a period of 1 hour. After the addition is completed, the mixture is warmed to 40° for 1 hour. At this point most of the material is in solution and an examination of a sample by ionophoresis shows complete conversion. The tannish-brown spots of the hydroxymethyleneketone migrate slower than the purplish-brown spots of the starting material. The solution is filtered, and, after the adjustment of the pH of the filtrate to 6.5 by the addition of glacial acetic acid, the filtrate is evaporated in high vacuo to dryness at bath temperatures not exceeding 40°. A rotary evaporator is used to prevent bumping. The residue is dissolved in 200 ml. of ice cold 6% aqueous sodium hydroxide. The resulting solution is filtered through glass. The filtrate is made slightly acidic (pH about 6.5) by the careful addition of 10% aqueous acetic at 0°. The precipitate is filtered off, washed with water, and dried in a vacuum desiccator over sulfuric acid. Yield: 10 g. of 18-hydroxymethylene-16α-methylyohimbone.

Fractional precipitation from water at pH 6.2–7.5 followed by recrystallization from acetone-water yields the crystalline product, M.P. 202–205°, $[\alpha]_D^{25} = -232°$ (pyridine, c.=0.8)

*Analysis.*—Calc.: C, 71.16; H, 7.39; N, 7.90. Found: C, 71.35; H, 7.51; N, 8.00.

EXAMPLE 4

*18-Hydroxymethylene-16α-Methylyohimbone*

A suspension of 25 g. 16α-methylyohimbone is added to a sodium methoxide mush, prepared from 11.5 g. sodium and 160 ml. absolute ethanol at 0°. After 15 min. of stirring, 100 ml. dry ethylformate are added over a period of 30 min. at 0°. The stirring is discontinued 10 min. after the completion of the addition, the pH is adjusted to 6.5, and the mixture is worked up as described above to yield 18-hydroxymethylene-16α-methylyohimbone.

EXAMPLE 5

*18-Benzoyloxymethyleneyohimbone*

To a solution of 2 g. 18-hydroxymethyleneyohimbone in 5 ml. dry pyridine, a solution of 2 g. benzoic acid anhydride is rapidly added at 0°. The mixture is allowed to stand at 0° for 4 hours, the separated crystals are filtered off, washed with ether, and dried in a vacuum over sulfuric acid to yield 2.05 g. (74%) 18-benzoyloxymethyleneyohimbone. Recrystallization from 95% ethanol yields the analytical sample (as a hemihydrate), M.P. 203–205°, $[\alpha]_D^{25} = -272°$ (pyridine, c.=0.8).

*Analysis.*—Calc.: C, 74.46; H, 6.25; N, 6.43. Found: C, 74.26; H, 6.28; N, 6.21.

In the foregoing examples, all temperatures are given in degrees centigrade.

It is understood that the foregoing detailed description is given merely by way of illustration and that many variations may be made therein without departing from the spirit of our invention.

Having described our invention, what we desire to secure by Letters Patent is:

1. 18-hydroxymethylene-16α-methylyohimbone.
2. 18-benzoyloxymethyleneyohimbone.

References Cited in the file of this patent

Johnson et al.: Jour. Amer. Chem. Soc., vol. 67 (1945), pages 1745, 1746 and 1749.

Weisenborn et al.: Jour. Amer. Chem. Soc., vol. 76 (1954), pages 552–555.

Gusakova et al.: Chem. Abstracts, vol. 50 (1956), pages 3473–3474.